United States Patent [19]

Strack et al.

[11] Patent Number: 4,714,690

[45] Date of Patent: Dec. 22, 1987

[54] SILICATE-BOUND ZEOLITE GRANULATES, PROCESS FOR THEIR PRODUCTION AND USE

[75] Inventors: Hans Strack, Alzenau; Peter Kleinschmit, Hanau, both of Fed. Rep. of Germany

[73] Assignee: Degussa Aktiengesellschaft, Frankfurt am Main, Fed. Rep. of Germany

[21] Appl. No.: 791,032

[22] Filed: Oct. 24, 1985

Related U.S. Application Data

[63] Continuation of Ser. No. 597,281, Apr. 6, 1984, abandoned.

[30] Foreign Application Priority Data

Apr. 11, 1983 [DE] Fed. Rep. of Germany ....... 3312876

[51] Int. Cl.$^4$ .............................................. B01J 29/06
[52] U.S. Cl. ......................................... 502/64; 502/69
[58] Field of Search ..................... 502/8, 9, 64, 69, 60, 502/70

[56] References Cited

U.S. PATENT DOCUMENTS

| | | | |
|---|---|---|---|
| 2,973,327 | 2/1961 | Mitchell et al. | 502/8 |
| 3,055,841 | 9/1962 | Gladrow et al. | 502/64 |
| 3,377,295 | 4/1968 | Pryor | 502/64 |
| 3,624,003 | 11/1971 | Conde et al. | 502/64 |

*Primary Examiner*—Carl F. Dees
*Attorney, Agent, or Firm*—Beveridge, DeGrandi & Weilacher

[57] ABSTRACT

Silicate-bound zeolite granulates are disclosed wherein the zeolite contains a cation which is not present in the binder, and where the zeolite can also contain the binder cation. The granulates are produced by placing powdered zeolite in a mixer, adding sodium silicate solution, mixing until zeolite granulates with a grain size of at least 0.1 mm are obtained, optionally after-rolling the zeolite granulates. The moist zeolite granulates can be initially dried at temperatures of 20 degrees to 39 degrees C., where the carbon dioxide content of the drying air is adjusted to less than 200 ppm. Thereafter, a second drying step can be carried out at temperatures of 40 degrees to 120 degrees C. as well as a third drying stage at 121 degrees to 200 degrees C. under otherwise identical conditions. The products may be activated at temperatures of 600 degrees C. maximum. The zeolite granulates thus obtained are then treated with a first aqueous metal salt solution, washed and then optionally treated with a second aqueous metal salt solution, washed and dried again at 40 degrees to 200 degrees C., preferably 100 degrees to 120 degrees C., and then optionally calcined to 300 degrees to 650 degrees C.

28 Claims, No Drawings

SILICATE-BOUND ZEOLITE GRANULATES, PROCESS FOR THEIR PRODUCTION AND USE

This is a request for filing a continuation application under 37 CFR 1.60, of pending prior application Ser. No. 597,281 filed on Apr. 6, 1984 (now abandoned).

The invention relates to new silicate-bound zeolite granulates, the process for their production, and use of the zeolite granulates as adsorption agents.

It is known to produce magnesium-silicate-bound zeolite granulates with the use of water glass, by forming crystalline zeolite (NaA) with an alkali silicate, in which the ratio $Me_2O:SiO_2$ is 1:3 to 1:5 and the formed product is then dried at temperatures between 40 degrees and 280 degrees C. to a residual moisture content of 0 to 35 wgt. percent, then treated with a 0.5 to 35 percent magnesium salt solution until complete ion exchange in the zeolite and conversion of the alkali silicate to magnesium silicate is obtained. The granulates are then freed of adhering salt solution by washing with water and are finally activated at temperatures above 200 degrees C.

The magnesium-silicate-bound zeolite granulates produced in this way are characterized by the fact that the alkali metals contained in the starting mixture have been completely replaced by magnesium in the granulates. The granulates produced according to the known process have an apparent pore diameter of 3 Angstroms and, except for water and ammonia, do not take up any of the industrially used gases (German Published Application No. 15 67 388).

The object of the invention is to produce silicate-bound zeolite granulates which can also absorb other molecules, in addition to water and ammonia.

A feature of the invention resides in silicate-bound zeolite granulates, the zeolite of which contains a cation which is not present in the binder, and where the zeolite can additionally also contain the binder cation.

The process for production of the silicate-bound zeolite granulates is carried out by placing powdered zeolite in a mixer, adding sodium silicate solution thereto, and mixing until zeolite granulates with a grain size of at least 0.1 mm are obtained. These zeolite granulates are optionally after-rolled, the moist zeolite granulates are optionally initially dried at temperatures of 20 to 39 degrees C., where the carbon dioxide content of the drying air is adjusted to less than 200 ppm, are then optionally dried in a second drying step at temperatures of 40 degrees to 120 degrees C., and optionally in a third drying stage at 121–200 degrees C. under otherwise identical conditions and are then optionally activated at temperatures of 600 degrees C. maximum. The zeolite granulates thus obtained are treated with a first aqueous metal salt solution, washed, then optionally treated with a second aqueous metal salt solution, washed, dried at 40 degrees to 200 degress C., preferably 100 degrees to 120 degrees C., and then optionally calcined at 300 degrees to 650 degrees C.

Zeolite A and/or zeolite X can be used as zeolite powders. Zeolite Y, mordenite, and/or zeolites of the Pentasil group can also be used as zeolite powders. These zeolite powders are preferably used in their sodium form. These materials are known in the art and any suitable zeolite may be used for purposes of the invention.

A powdered zeolite, which has been produced according to German OLS No. 24 47 021, German OLS No. 25 17 218, German OLS No. 26 51 419, German OLS No. 26 51 420, German OLS No. 26 51 436, German OLS No. 26 51 437, German OLS No. 26 51 445, and/or German OLS No. 26 51 485 and shows the particle size distribution indicated there can be used as the zeolite A.

A zeolite powder of type A according to German OLS No. 26 51 485 is preferably used.

The water content of the zeolite can amount to 0.1–27 percent, preferably 15 to 22 percent.

The sodium silicate solution has an $SiO_2:Na_2O$ modulus of 1.0 to 3.4, an $Na_2O$ content of 2–20 wgt. percent, and an $SiO_2$ content of 5–31 wgt. percent.

A commercial zeolite X, for example, as described in German Patent No. 10 38 016, can be used as the zeolite X. A zeolite Y according to German Patent No. 10 98 929 can be used as the zeolite Y.

The mordenite is known from German Patent No. 11 97 855. The type ZSM-5 according to U.S. Pat. No. 3,702,886 can be used, for example, as a zeolite of the Pentasil group.

The mixture of zeolite and sodium silicate, depending on the zeolite type, shows the following composition:

| Zeolite | $Na_2O$ | $Al_2O_3$ | $SiO_2$ | $H_2O$ |
|---|---|---|---|---|
| A | 1,2 ± 0,2 | 1 | 2,4 ± 0,4 | 12 ± 3 |
| X | 1,2 ± 0,2 | 1 | 3,0 ± 0,5 | 25 ± 5 |
| Y | 1,7 ± 0,5 | 1 | 5,0 ± 1,5 | 30 ± 10 |
| Mordenit | 2,0 ± 0,8 | 1 | 13 ± 2 | 40 ± 10 |
| ZSM-5 | 4 ± 2 | 1 | 35 ± 15 | 90 ± 20 |

Commercial mixers, preferably containing a spraying device, such as plowshare mixers, screw mixers, mixing granulators, and the like can be used as mixers.

A known apparatus, such as a granulating tray, coating drum, and the like can be used as an after-rolling device. In this case, a mechanical compaction and rounding-off of the zeolite granulate and a narrowing of the grain size distribution are achieved.

The drying of the zeolite granulates can be carried out continuously or discontinuously in known equipment such as drying cabinets, belt dryers, or fluidized bed dryers. A fluidized bed dryer is preferably used, because in this case, a dedusting of the zeolite granulates is simultaneously achieved. The exhaust air of the drying step can be recycled, for which, in order to adjust the carbon dioxide content to less than 200 ppm, the exhaust drying air is mixed with the corresponding quantity of fresh air.

The drying can be carried out equally well in an inert gas stream, such as nitrogen, i.e., the presence of carbon dioxide is not necessary.

The drying gas can show a partial water-vapor pressure of 0.01 torr to 750 torr, preferably 0.1 to 400 torr, with the partial pressure of the water vapor in the drying gas having to be below the saturation pressure at the corresponding drying temperature. This is optionally followed by a screening with known screening equipment, in which case the screening can be carried out optionally with moist or dried zeolite granulates. In the case of moist screening, a mechanical destruction of the zeolite granulates must be avoided, but in this case the outsize particles (oversize and undersize particles) can be easily mechanically comminuted and returned to the granulation process. The dried zeolite granulates can be activated continuously or discontinuously at temperatures of 300 to 500 degrees C., at most 600 degrees C., in known equipment, such as a muffle furnace, rotary kiln, tubular furnace, or the like.

The treatment of the zeolite granulates with a first metal salt solution leads primarily to the fact that the cation of the binder is exchanged. The treatment of the zeolite granulates with the first metal salt solution can be carried out in known equipment such as, for example, exchanger columns. The treatment temperature can be 5 degrees to 100 degrees C., preferably 40 degrees to 90 degrees C. The concentration of the metal salt solutions can be 0.01 to 10 molar, preferably 0.1 to 3 molar.

The exchange time can be 1 minute to 6 hours, preferably 30 minutes to 3 hours. It is important in this case that the sodium ions of the binder are completely exchanged against metal-salt ions. A complete exchange of the sodium ions in the zeolite is prevented by the fact that the exchanged sodium ions are left in the magnesium salt solution. For this purpose, the metal salt solution can be preferably recirculated by pumping during the treatment. The exchange of the zeolite cation, in addition to the complete exchange of the binder cation, takes place only if the metal salt cation is capable of penetrating into the zeolite. The complete exchange of the zeolite cation is prevented, for example, by omitting an intermediate calcination in the treatment steps with aqueous metal salt solution or by terminating the treatment with metal salt solutions before the cation to be exchanged has been completely removed from the lattice.

The following can be used as the first metal solutions: magnesium salt solutions such as, for example, magnesium chloride, magnesium sulfate; calcium salt solutions such as, for example, calcium chloride, calcium nitrate; barium salt solutions such as, for example, barium chloride; aluminum salt solutions such as, for example, aluminum chloride, aluminum sulfate; salt solutions of rare earths such as, for example, rare earth chlorides.

As the second salt solution, solutions whose cations are capable of penetrating into the zeolite lattice can be used. In this second treatment stage, the cations in the zeolite lattice are exclusively exchanged.

These metal salt solutions can be: soluble salts, e.g., chlorides, sulfates, nitrates of, for example, the following metals: silver, magnesium, calcium, barium, cobalt, nickel, zinc, and others. Those cations that are capable of penetrating into the lattice of the zeolite are suitable. The exchange with the second metal salt solution can be carried out under the same conditions and with the same equipment as the exchange with the first metal salt solution. The zeolite granulates according to the invention then shows a content of sodium ions after conclusion of the treatment with aqueous metal salt solutions. This sodium-ion content is restricted to the zeolite component of the zeolite granulate, while the binder is free of sodium ions.

On the basis of the production process according to the invention, the silicate binder is not a zeolite, i.e., the silicate binder is present in pure form along with the zeolite used.

The zeolite granulates according to the invention can be used advantageously as adsorption agents.

They can adsorb the following molecules, among others:

$H_2O$, $NH_3$, $CH_3OH$, $CO_2$ and n-hexane.

EXAMPLE 1:

(Production of the Starting Zeolite Granulates Based on Zeolite A)

100 kg of zeolite A (produced according to German OLS No. 26 51 485, 21 percent water content) is placed in a screw mixer. 49 kg of sodium silicate solution (modulus 3.38, $Na_2O$=4.8 wgt. percent, $SiO_2$=15.7 wgt. percent) is added to this by spraying. Zeolite granulates with a grain size of 0.1 to 3 mm are obtained, which are then after-rolled in a granulating tray. In this way a narrower grain spectrum is obtained (0.3 to 2.5 mm). The zeolite granulates are screened into grain fractions less than 1 mm, 1–2 mm, and greater than 2 mm in the moist state.

The grain fraction of 1–2 mm (starting compound 1A) is dried in a fluidized bed drier in a first stage at 35 degrees C. In this process, part of the exhaust air is recycled, so that the $CO_2$ content of the air is 150 ppm. The partial water vapor pressure is 21 mm Hg. This zeolite granulate (starting compound 1B) is activated in a rotary kiln at 420 degrees C. (starting compound 1C).

| Grain size | 1–2 mm |
| --- | --- |
| Appearance | round, white, dust-free |
| Breaking strength | minimum 2 kg (1 mm bead) |
| Adsorption data | (p/po = 0.8, 20 degrees C., saturation loading) |
| $H_2O$ | 23.4 percent |
| $NH_3$ | 12.0 percent |
| $CO_2$, $O_2$, $N_2$, Ar | 0.1 percent |
| Methanol, ethanol | 0.2 percent |

EXAMPLE 2

(Production of the Starting Zeolite Granulates Based on Zeolite X)

75 kg of zeolite X (German Patent No. 10 38 017; $SiO_2:Al_2O_3$ =25; 21 percent water content) is placed in a screw mixer and mixed with 83.5 kg of sodium silicate solution ($Na_2O$=3.3 percent; $SiO_2$=10.7 percent). A zeolite granulate with a grain size of 0.1 to 3 mm is obtained, which was exclusively after-rolled in a granulating tray. This product was dried at 34 degrees C. in a fluidized bed dryer, with the $CO_2$ content being adjusted to 150 ppm by recycling. The partial water vapor pressure was 18 torr. The dried zeolite granulate was activated at 400 degrees C. in a rotary kiln.

EXAMPLE 3

(Production of the Starting Zeolite Granulates Based on Zeolite Y)

75 kg of zeolite Y (produced according to German Patent No. 10 98 929; $SiO_2/Al_2O_3$=4.6; 18 percent water content) is mixed with 90.5 kg of sodium silicate solution ($Na_2O$=3.3 percent; $SiO_2$ =10.7 percent) in a screw mixer. The further processing is carried out as described in Example 2.

EXAMPLE 4

(Production of the Starting Zeolite Granulates Based on Mordenite)

2.17 kg of mordenite (commercial product, Norton Company, Na form, 8 percent water content) is mixed in a plowshare mixer with 2.0 kg of sodium silicate solution (3.3 percent $Na_2O$, 10.7 percent $SiO_2$) until zeolite granulates of 0.5 to 5 mm have formed. The screened 1–2 mm fraction is after-rolled in a coating drum, dried in a forced-air drying cabinet, initially at ambient temperature and then at 110 degrees C., and activated in a muffle furnace at 450 degrees C.

EXAMPLE 5

(Production of the Starting Zeolite Granulates Based on Pentasil)

2 kg of Pentasil, produced according to U.S. Pat. No. 3,702,886, $SiO_2:Al_2O_3=35.1$ percent water content is mixed in a plowshare mixer with 2.0 kg of sodium silicate solution (3.3 percent $Na_2O$, 10.7 percent $SiO_2$) until zeolite granulates with a diameter of 0.5 to 5 mm have formed. The screened 1-2 mm fraction is after-rolled in a coating drum, dried in a forced-air dryer, initially at ambient temperature and then at 110 degrees C., and activated in a muffle furnace at 450 degrees C.

The production of the zeolite granulates according to the invention, starting from the starting zeolite granulates according to Examples 1-5, is described below.

EXAMPLES 6-12, 14, 15, 17-20

A specific quantity of starting zeolite granulate according to Example 1A, 1B, 1C or 2 is treated in an exchanger column (length=1 meter, diameter=0.2 meter) with a metal salt solution in the first stage and is then washed until the conductivity in the wash water is below 500 $\mu S$. The zeolite granulate is then optionally treated with a second metal salt solution and is washed under the same conditions. The product is then dried in a drying cabinet at 110 degrees C. and activated in a muffle furnace at 450 degrees C.

EXAMPLES 13, 16, 21-24

Starting zeolite granulates according to Examples 1C, 3, 4, 5 are treated with a metal salt solution in a 2-liter beaker, washed until the conductivity of the wash water is below 500 $\mu S$, dried in a drying cabinet at 110 degrees C., and activated in a muffle furnace at 450 degrees C.

The detailed conditions of the process are shown in Table 1.

TABLE 1

| Example | Starting compound Zeolite Type kilograms | 1. Exchange solution | | | | | 2. Exchange solution | | | | |
|---|---|---|---|---|---|---|---|---|---|---|---|
| | | Type | Quantity liters | Concentration moles/liter | time hours | Temperature degrees C. | Type | Quantity liters | Concentration moles/liter | time hours | Temperature degrees C. |
| 6 | 18,5 A (1A) | MgCl$_2$ | 20 | 0,25 | 3 / 2 | RT / 60 | | | | | |
| 7 | 15 A (1B) | MgCl$_2$ | 20 | 0,25 | 3 | 60 | | | | | |
| 8 | 12 A (1C) | MgCl$_2$ | 20 | 0,25 | 3 | 80 | | | | | |
| 9 | 12 A (1C) | MgCl$_2$ | 20 | 0,25 | 3 | 80 | KCl | 20 | 1 | 2 | 60 |
| 10 | 10 A (1C) | MgCl$_2$ | 20 | 0,25 | 3 | 80 | NaCl | 20 | 1 | 2 | 60 |
| 11 | 12 A (1C) | MgCl$_2$ | 20 | 0,25 | 3 | 80 | CaCl$_2$ | 20 | 1 | 2 | 60 |
| 12 | 12 A (1C) | CaCl$_2$ | 20 | 1,3 | 3 | 60 | | | | | |
| 13 | 0,15 A (1C) | BaCl$_2$ | 0,5 | 0,5 | 1 | 60 | | | | | |
| 14 | 12 A (1C) | Al$_2$(SO$_4$)$_3$ | 20 | 0,12 | 1 | 60 | | | | | |
| 15 | 12 A (1C) | Al$_2$(SO$_4$)$_3$ | 20 | 0,12 | 1 | 60 | KCl | 20 | 0,6 | 2 | 60 |
| 16 | 0,1 A (1C) | SECl$_3$ | 0,5 | 0,5 | 2 | 60 | | | | | |
| 17 | 12 X (2) | MgCl$_2$ | 20 | 0,25 | 3 | 60 | | | | | |
| 18 | 12 X (2) | CaCl$_2$ | 20 | 1,0 | 3 | 60 | | | | | |
| 19 | 12 X (2) | Al$_2$(SO$_4$)$_3$ | 20 | 0,12 | 1 | 60 | | | | | |
| 20 | 12 X (2) | Al$_2$(SO$_4$)$_3$ | 20 | 0,12 | 1 | 60 | KCl | 20 | 0,6 | 2 | 60 |
| 21 | 0,1 X (2) | SECl$_3$ | 0,5 | 0,5 | 2 | 60 | | | | | |
| 22 | 0,5 Y (3) | MgCl$_2$ | 1,5 | 0,25 | 2 | 60 | | | | | |
| 23 | 0,5 Mord. (4) | MgCl$_2$ | 1,5 | 0,25 | 2 | 60 | | | | | |
| 24 | 0,5 ZSM5 (5) | MgCl$_2$ | 1,5 | 0,25 | 2 | 60 | | | | | |

The composition and, where applicable, the adsorption data of the starting compounds Lc-5 and of the zeolite granulates 6-24 according to the invention are shown in Table 2.

TABLE 2

| Example | Zeolite | Catons | Binder | Adsorption Data | | | | | | Kinetic Index for water |
|---|---|---|---|---|---|---|---|---|---|---|
| | | | | H$_2$O 30' | H$_2$O 600' | NH$_3$ | CH$_3$CH | nHexan | CO$_2$ | |
| 1C | A | Na | Na-Silikat | 16,2 | 23,4 | 7,5 | 1,1 | 0,3 | 2,0 | 0,69 |
| 2 | X | Na | Na-Silikat | | | | | | | |
| 3 | Y | Na | Na-Silikat | } n.b. | | | | | | |
| 4 | Mordenit | Na | Na-Silikat | | | | | | | |
| 5 | ZSM 5 | Na | Na-Silikat | | | | | | | |
| 6 | A | Na,Mg | Mg-Silikat | 25,9 | 26,4 | 14,4 | 18,4 | 4,1 | 13,9 | 0,98 |
| 7 | A | Na,Mg | Mg-Silikat | 25,7 | 26,9 | 14,3 | 20,2 | 3,6 | 14,5 | 0,96 |
| 8 | A | Na,Mg | Mg-Silikat | 23,7 | 25,1 | 11,7 | 15,7 | 2,7 | 8,4 | 0,94 |
| 9 | A | Na,K | Mg-Silikat | 17,5 | 22,2 | 7,7 | 15,4 | 2,1 | 1,2 | 0,79 |
| 10 | A | Na | Mg-Silikat | 24,4 | 24,8 | 13,2 | 17,9 | 3,3 | 13,8 | 0,98 |
| 11 | A | Na,Ca | Mg-Silikat | 22,0 | 23,4 | 12,2 | 18,9 | 13,5 | 16,4 | 0,94 |
| 12 | A | Na,Ca | Ca-Silikat | 21,1 | 21,5 | 11,9 | 17,5 | 13,7 | 17,5 | 0,98 |
| 13 | A | Na,Ba | Ba-Silikat | 12,5 | 15,0 | | 0,7 | 0,3 | | 0,83 |
| 14 | A | Na | Al-Silikat | 21,5 | 23,2 | 9,5 | 4,2 | 4,3 | 4,3 | 0,93 |
| 15 | A | Na,K | Al-Silikat | 18,5 | 22,8 | | 1,4 | 1,4 | 1,0 | 0,81 |
| 16 | A | Na | SE-Silikat | 15,3 | 17,6 | 8,0 | 3,3 | 0,9 | 3,3 | 0,87 |
| 17 | X | Na,Mg | Mg-Silikat | 27,3 | 29,4 | | 21,3 | 17,8 | 17,2 | 0,93 |
| 18 | X | Na,Ca | Ca-Silikat | 23,4 | 23,7 | 14,2 | 18,1 | 12,0 | 15,5 | 0,99 |
| 19 | X | Na,Al | Al-Silikat | 25,8 | 26,3 | 13,4 | 16,6 | 12,7 | 16,4 | 0,96 |
| 20 | X | Na,K | Al-Silikat | 22,6 | 22,9 | | 15,0 | 12,9 | 10,7 | 0,99 |
| 21 | X | Na,SE | SE-Silikat | 23,9 | 24,3 | 13,2 | 17,4 | 12,9 | 16,9 | 0,98 |

TABLE 2-continued

| | | | | Adsorption Data | | | | | | |
|---|---|---|---|---|---|---|---|---|---|---|
| Example | Zeolite | Catons | Binder | $H_2O$ 30' | $H_2O$ 600' | $NH_3$ | $CH_3CH$ | nHexan | $CO_2$ | Kinetic Index for water |
| 22 | Y | Na,Mg | Mg-Silikat | n.b. | | | | | | |
| 23 | Mordenit | Na,Mg | Mg-Silikat | | | | | | | |
| 24 | ZSM 5 | Na,Mg | Mg-Silikat | | | | | | | |

The entire disclosure of German priority application No. P 33 12 876.6 is relied on and incorporated herein by reference. All other patent documents identified herein by number are incorporated herein by reference.

We claim:

1. Silicate-bound zeolite granulates, comprising zeolite dispersed in an alkali silicate binder, the binder having an alkali metal cation, the zeolite having a first metal cation which is essentially absent from the composition of the binder, and wherein the zeolite also additionally contains a second metal cation which second cation is present in the binder.

2. The silicate-bound zeolite granulates of claim 1 further comprising the original cation in the binder having been essentially completely exchanged by a different cation.

3. The silicate-bound zeolite granulates of claim 2 further comprising the binder is sodium silicate wherein the sodium ions are essentially completely exchanged by a different cation.

4. The silicate-bound zeolite granulates of claim 3 further comprising the binder is sodium silicate wherein the sodium ions are essentially completely exchanged by a member selected from magnesium, calcium, barium, aluminum, and the rare earths.

5. The silicate-bound zeolite granulates of claim 1 further comprising wherein the zeolite has a portion of its cation exchanged by a different cation.

6. The silicate-bound zeolite granulates of claim 1 further comprising the zeolite having sodium as its cation.

7. The silicate-bound zeolite granulates of claim 6 further comprising the sodium cation of the zeolite having been partially replaced by a different cation.

8. The silicate-bound zeolite granulates of claim 5 further comprising the cation of the zeolite partially exchanged by a different cation capable of penetrating into the zeolite lattice.

9. The silicate-bound zeolite granulate of claim 5 further comprising the cation of the zeolite partially exchanged by a metal ion selected from the group of silver, magnesium calcium, barium, cobalt, nickel and zinc.

10. A process for the production of a silicate-bound zeolite granulate comprising mixing powdered zeolite with a alkali metal silicate solution until zeolite granulates having a grain size of at least 0.1 mm are obtained, treating the zeolite granulates thus obtained with an aqueous metal salt solution to exchange the alkali metal of said silicate binder with a different cations and permitting the exchanged alkali metal ions of said binder to remain in the presence of said aqueous metal salt whereby complete exchange of the cation in the zeolite is prevented, to thereby obtain silicate-bound zeolite granulates wherein the alkali metal of said binder is exchanged for the cation of the aqueous metal salt.

11. The process of claim 10 further comprising rolling the zeolite granulates after they are formed.

12. The process of claim 10 further comprising initially drying the zeolite granulate.

13. The process of claim 12 further comprising drying at a temperature of about 20 to 39 degrees C.

14. The process of claim 12 further comprising drying in air where the carbon dioxide content is less than 200 ppm.

15. The process of claim 12 further comprising a second drying step.

16. The process of claim 15 further comprising a second drying step at 40 to 120 degrees C.

17. The process of claim 15 further comprising a third drying step.

18. The process of claim 17 further comprising a third drying step at 121 to 200 degrees C.

19. The process of claim 10 further comprising activating the zeolite granulate by heating to a temperature of no more than 600 degrees C.

20. The process of claim 10 further comprising thereafter washing the metal salt treated zeolite granules.

21. The process of claim 10 further comprising treating the zeolite granulate with a second aqueous salt solution.

22. The process of claim 21 further comprising thereafter washing.

23. The process of claim 23, further comprising drying.

24. The process of claim 23 further comprising drying at 40 to 200 degrees C.

25. The process of claim 24 further comprising drying at 100 degrees to 120 degrees C.

26. The process of claim 23 further comprising calcining.

27. The process of claim 26 further comprising calcining at 300 degrees to 650 degrees C.

28. Silicate-bound zeolite granulates comprising zeolite dispersed in an alkali silicate binder, the binder having contained an alkali metal cation which is essentially completely replaced by a different cation, said granulates having been produced by contacting silicate-bound zeolite with an aqueous metal salt containing a metal cation.

* * * * *